United States Patent [19]

Tanimoto et al.

[11] 4,393,462
[45] Jul. 12, 1983

[54] ELECTRONIC TRANSLATOR WITH MEANS FOR PRONOUNCING INPUT WORDS AND TRANSLATED WORDS

[75] Inventors: Akira Tanimoto, Kashihara; Tosaku Nakanishi, Nara; Shigenobu Yanagiuchi, Tenri, all of Japan

[73] Assignee: Sharp Kabushiki Kaisha, Osaka, Japan

[21] Appl. No.: 199,445

[22] Filed: Oct. 22, 1980

[30] Foreign Application Priority Data

Oct. 24, 1979 [JP] Japan ............... 54-137922
Oct. 25, 1979 [JP] Japan ............... 54-138383

[51] Int. Cl.³ ............................................ G06F 15/38
[52] U.S. Cl. ............................ 364/900; 179/1 SM
[58] Field of Search .................. 364/900 MS File; 179/1 SM

[56] References Cited

U.S. PATENT DOCUMENTS 3,704,345 11/1972 Coker et al. ............... 179/1 SM X
4,159,536 6/1979 Kehoe et al. ...................... 364/900

FOREIGN PATENT DOCUMENTS 2014765 8/1979 United Kingdom ........... 179/1 SM

Primary Examiner—Raulfe B. Zache
Attorney, Agent, or Firm—Birch, Stewart, Kolasch and Birch

[57] ABSTRACT

An electronic translator comprises means for providing pronunciation of an input word or words entered. There are further provided means for providing pronunciation of a translated word or words equivalent to the input word or words. If the input words contain a special word which is pronounced in different ways dependent on the following word, there is additionally provided means for detecting the input of such a special word and for changing the pronunciation of such a special word depending on the following word.

6 Claims, 3 Drawing Figures

FIG. I

ELECTRONIC TRANSLATOR WITH MEANS FOR PRONOUNCING INPUT WORDS AND TRANSLATED WORDS

BACKGROUND OF THE INVENTION

The present invention relates to a portable word information storage apparatus and, more particularly, to an electronic interpreter with means for pronouncing input words and their translated words.

Recently, improved portable electronic dictionary and language interpreters have been put on the market. U.S. patents relevant to the above types of dictionaries were issued, for example, U.S. Pat. No. 4,158,236 grated to Levy, issued June 12, 1979, entitled "ELECTRONIC DICTIONARY AND LANGUAGE INTERPRETER" and U.S. Pat. No. 4,159,536 to Kehoe et al., issued June 26, 1979, entitled "PORTABLE ELECTRONIC LANGUAGE TRANSLATION DEVICE".

For those portable devices, it is further desirable that input words be pronounced in order to assure that the input words hve correctly been entered.

SUMMARY OF THE INVENTION

Accordingly, it is an object of the invention to provide an improved portable translator comprising means for providing pronunciation of an input word or words.

It is another object of the invention to provide an improved portable electronic translator comprising means for providing pronunciation of input words and their translated words.

It is a further object of the invention to provide an improved portable electronic translator comprising means for repeating pronunciation of translated words equivalent to input words.

It is a further object of the invention to provide an improved portable electronic translator comprising changing means for changing the pronunciation of a special word such as a definite article, depending on the following words.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic translator comprises means for providing pronunciation of an input word or words entered. As one of the features of the present invention, there are further provided means for providing pronunciation of a translated word or words equivalent to the input word or words. If the input words contain a special word which is differently pronounced dependent on the following word, there is additionally provided means for detecting the input of such a special word and for changing the pronunciation of such a special word depending on the following word. For example, a type of such a special word is the definite article in English.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

First of all, any languages can be applied to an electronic translator of the present invention. An input word is spelled in a specific language to obtain an equivalent word, or a translated word spelled in a different language corresponding thereto. The kind of the languages can be freely selected. According to an example of the present invention, it is assumed that the input language is English and the translated language is Japanese.

Figure 1:
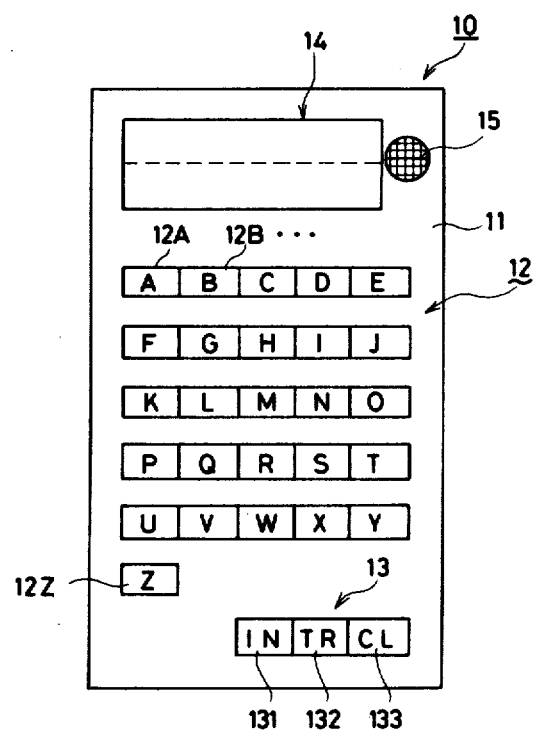
FIG. 1 shows a plan view of an electronic translator according to the present invention.

Referring now to FIG. 1, there is illustrated an electronic translator 10 according to the present invention. The electonic translator 10 comprises a body 11, an alphabetical keyboard 12, a functional keyboard 13, a display 14, and a speaker 15.

The alphabetical keyboard 12 contains a full number of English alphabetical key switches 12A through 12Z. The functional keyboard 13 contains an "IN" key switch 131, a "TR" key switch 132, and a "CL" key switch 133. The "IN" key switch 131 is actuated each time a single word has been entered by use of the alphabetical keyboard 12. The "TR" key switch 132 is actuated each time translation from English to Japanese is required. The "CL" key switch 133 is actuated to cancel one or more words which have been entered.

When translation from Japanese to English is desired, the alphabetical keyboard 12 may be adapted to enter words in Japanese or may be replaced by a Japanese alphabetical keyboard including a full number of Japanese alphabetical key switches. Such a modification should be conducted depending on what language to use for translation.

The display 14 may be of a dot matrix type composed of a liquid crystal display etc. The speaker 15 is used to provide an audible indication of input words in English and/or translated words in Japanese.

Figure 2:
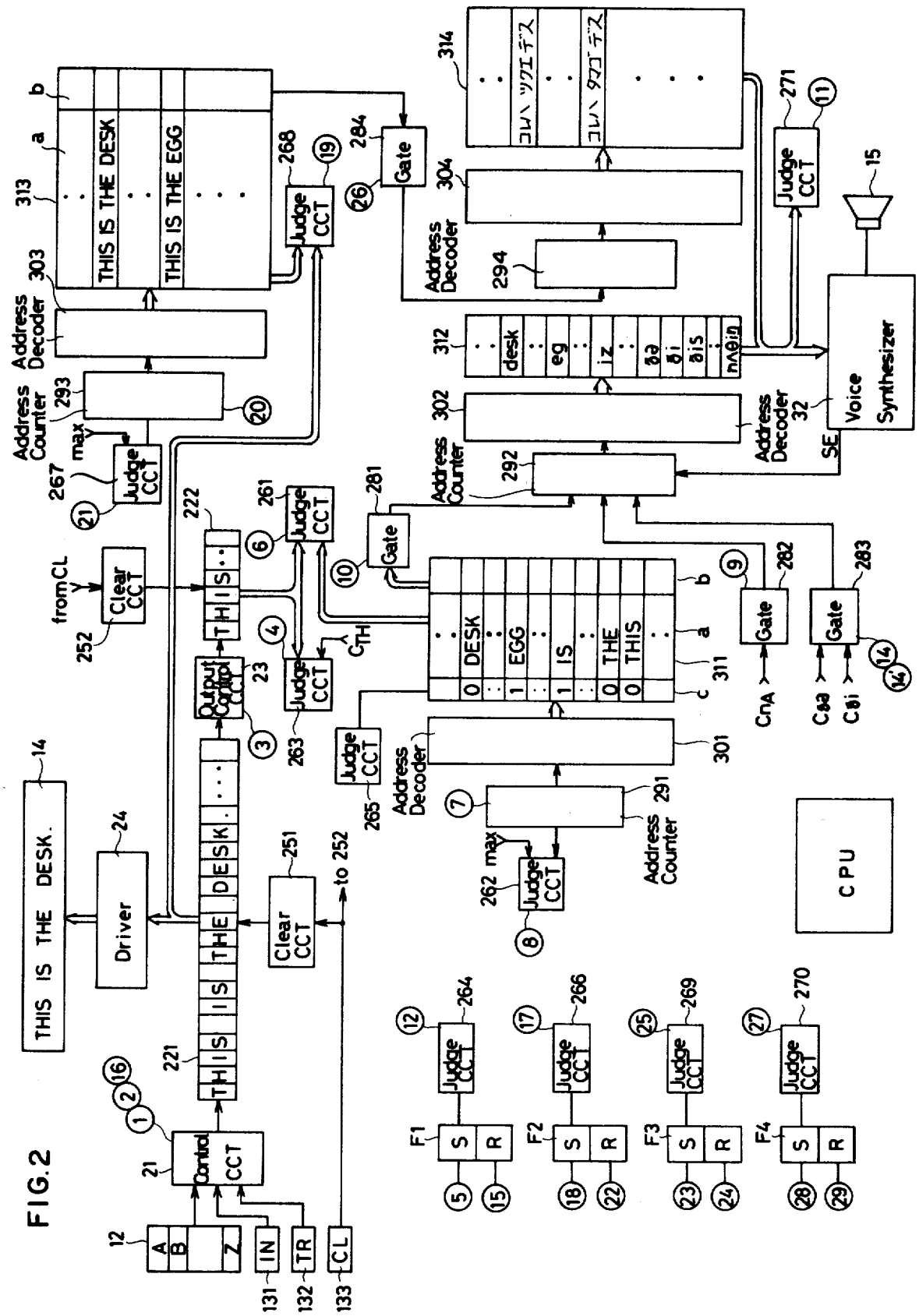
FIG. 2 shows a block diagram of a circuit implemented within the electronic translator as shown in FIG. 1.

FIG. 2 shows a block diagram of a circuit implemented within the electronic translator 10. The circuit comprises the above described alphabetical keyboard 12 and the functional keyboard 13, two registers 221 and 222, a control circuit 21, an output control circuit 23, a driver 24, an input word memory 311, an input word synthesizer memory 312, an input sentence memory 313, an input sentence synthesizer memory 314, gate circuits 281 through 284, address counters 291 through 294, address decoders 301 through 304, judge circuits 261 through 271, a voice synthesizer 32, flip flops F1 through F4, the above described display 14 and speaker 15, and a CPU.

The register 221 receives words or sentences which are entered by the alphabetical keyboard 12. The register 222 receives the first word of the words or sentence stored in the register 221. The control circuit 21 contains an encoder circuit and an input control circuit.

The input word memory 311 is provided to permanently store a plurality of words which contain the input words. Preferably, the memory 311 is composed of a Read Only Memory (ROM). The input word synthesizer memory 312 is provided to permanently store a plurality of kinds of voice information for the plurality of words contained in the memory 311. Preferably, the memory 312 is also composed of a ROM.

The input sentence memory 313 is provided to permanently store a plurality of sentences formed by use of the input words. The memory 313 is also composed of a ROM, preferably. The input sentence synthesizer memory 314 is provided for permanently storing a plurality of kinds of voice information each representing translated sentences equivalent to each of the sentences contained in the memory 313. Preferably, the memory 314 is composed of a ROM.

More particularly, the memory 311 comprises first storage locations a, second storage locations b, and third storage locations c. Each of the first storage locations a contains a single input word in the form of encoded information. Each of the second storage locations b contains head address data specifying each of the head addresses of the memory 312. Each of the words contained in the memory 311 corresponds to respective kinds of voice information stored in the memory 312. Each of the third storage locations c contains information specifying either a vowel sound or a consonant sound in the head word of each of the words stored in the first storage locations a. For example, the vowel sound is specified by a logical level "1" and the consonant sound is specified by another logical level "0". In this manner, a single word is stored in one or more addresses of the memory 311.

With respect to the word "THE" in the memory 311 as shown, the logical level of the storage location c is "0". However, either of "0" and "1" can be allotted in the third storage location c of the word "THE", as discussed below.

The memory 312 contains a plurality of kinds of voice information each corresponding to respective words in the memory 311. Each of the plurality of kinds of voice information is specified by each of the head address data of the memory 311. In the case where a specific word such as "THE" is pronounciated differently depending on whether the first letter of the following word is a vowel or consonant, the memory 312 contains two different pronunciation data with respect to such a specific word.

The memory 312 further contains specific data representing "NOTHING" meaning that an input word presently entered is not contained in the memory 311. The memory 312 contains a plurality of end codes each attached to each of sound data therein, for the purpose of notifying ends of sounds.

The memory 313 comprises first storage locations a and second storage locations b. Each of the first storage locations a contains one of a plurality of sentences formed by some input words, in the form of coded information. Each of the second storage locations b contains head address data specifying each of the plurality of kinds of voice information contained in the memory 314. The memory 314 contains a plurality of kinds of voice information of the translated language, each of the kinds of voice information corresponding to respective sentences in the memory 311. The memory 314 contains a plurality of end codes each attached to each of voice data therein, for the purpose of indicating the ends of voices.

The judge circuit 261 is provided to detect the equivalency of the word stored in the register 222 and words developed by the memory 311. The judge circuit 262 is provided to detect whether the value counted by the address counter 291 is over the last address of the memory 311. The judge circuit 263 is used to detect whether the word stored in the register 222 is, for example the definite article "THE". The judge circuit 265 is provided to detect, according to the third storage locations c of the memory 311, whether the head letter of the word to be developed by the memory 311 is a vowel sound or a consonant sound. The judge circuit 267 is provided to detect whether the value counted by the address counter 293 is over the last address of by memory 313.

The judge circuit 268 is provided to detect which one of the sentences in the memory 313 is equivalent to the sentence in the input language in the register 221. The judge circuit 271 is provided to detect the generation of the end code from the memories 312 and 314 to determine the termination of delivered voice information.

The CPU is provided to control the address counters 291 through 294, the flip flops F1 through F4, and the gate circuits 281 through 284.

Figure 3:
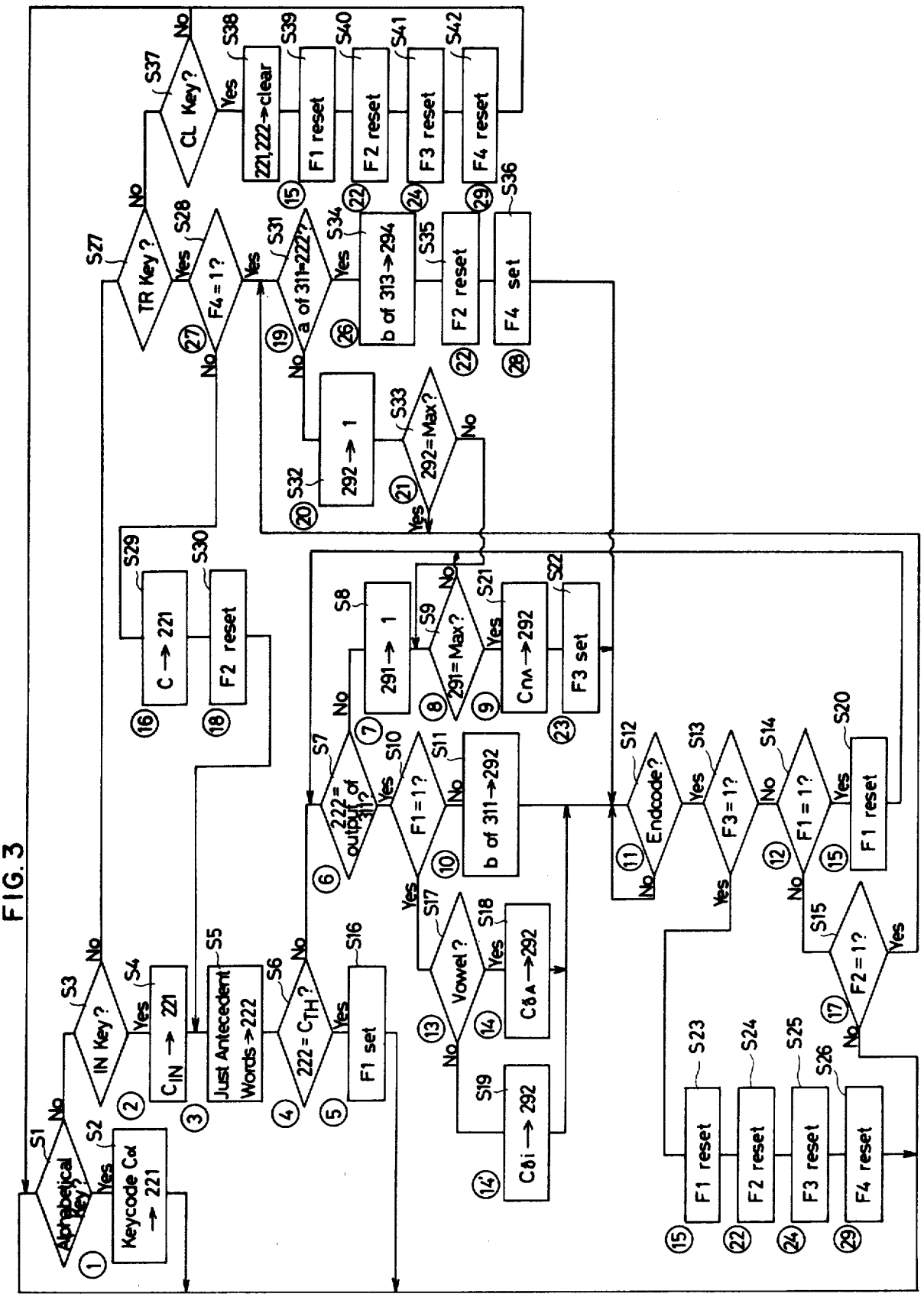
FIG. 3 shows a flow chart representing operation in accordance with the principle of the present invention.

The CPU includes a memory for fixedly storing a program implementing the flow chart as described in FIG. 3.

FIG. 3 shows a flow chart representing operation of the translator 10 in accordance with the present invention. In FIG. 3, respective steps of the flow chart are referred to as S and its step number. Each of the respective steps is executed by a circuit element of FIG. 2 indicated by a corresponding circled number.

With reference to FIGS. 1 through 3, operation of the electronic translator 10 will be described as follows:

An exemplary input sentence is assumed to be "THIS IS THE DESK". This sentence is entered by the alphabetical key switches of the alphabetical keyboard 12. At first, a word "THIS" is entered so that the control circuit 21 is operated to generate key code signals corresponding to the letters of the word "THIS". The register 221 receives the key code signals in the serial bit order. After the word "THIS" has been entered by the alphabetical keyboard 12, the "IN" key switch 131 is actuated. The control circuit 21 is operated to generate key code signals in response to the actuation of the "IN" key switch 131. Such key code signals are not displayed and are suppressed code. The suppressed code is stored in the register 221 as referred to the steps S1 through S4. Each time the alphabetical keyboard 12 and the "IN" key switch 131 are sequentially actuated, a word is entered to form a desired sentence.

Each time a single word is entered, the sound of such a single word is generated as follows:

When the "IN" key switch 131 is operated, the register 221 receives the suppressed code $C_{IN}$ in response to the "IN" key switch 131 in order to provide pronunciation. The output control circuit 23 is responsive to the actuation of the "IN" key switch 131 to transfer coded information representing the word "THIS" (the word input just preceding the actuation of the "IN" key switch 131) from the register 221 to the register 222 as referred to S5 in FIG. 3. The coded information presently contained in the register 222 is applied to the judge circuits 261 and 263. The judge circuit 263 receives a coded signal representing the definite article "THE" and detects whether the coded signal from memory 311 is equivalent to the coded information contained within the register 222 as referred to S6 of the flow chart.

If the judge circuit 263 detects that they are not equivalent, the operation is repeated for subsequent words in memory until the judge circuit 261 detects that the coded information within the register 222 is equivalent to coded information of a word generated by the memory 311 as referred to S7. The address counter 291 is set to be the head address of the memory 311. The value of the address counter 291 causes the address decoder 301 to select an address of the memory 311. One or more words stored in the first storage locations a of the memory 311 are generated.

At the same time, the counted value in the address counter 291 is entered to the judge circuit 262. The judge circuit 262 detects whether the counted value in the address counter 291 is equivalent to the last address of memory 311. The last address of the memory 311 is continuously applied to the judge circuit 262. The CPU detects whether the judge circuit 261 provides the equivalence detecting signals. If the judge circuit 261 does not provide the equivalence detecting signals, the CPU causes the counted value of the address counter 291 to advance by one as referred to S8. Then, the CPU again detects whether the judge circuit 262 detects the last address number of the memory 311.

By the repetition of steps S7 and S8, it is detected whether the coded signals of each of the words stored in the first storage locations a of the memory 311 are equivalent to those of the register 222. When the judge circuit 261 detects that the coded signals of the word of the register 222 are equivalent to those of the word developed by the memory 311, the CPU causes the gate circuit 281 to become conductive by the detection that the contents of the flip flop F1 are not "1", on the basis of the output of the judge circuit 264.

As a result, the gate circuit 281 provides the head address data stored at the address based on the counted value of the address counter 291, the head address data being stored in the second storage locations b of the memory address specified. The counted value of the address counter 292 is set to be identical to the head address data provided by memory 311 in step S11.

On the basis of the set value of the address counter 292, the address decoder 302 selects a certain address of the memory 312. Accordingly, coded signals representing pronunciation, namely, [ð is] of the word within the register 222 are developed by the memory 312 and then applied to the voice synthesizer 32. The voice synthesizer 32 is responsive to the coded signals developed by providing verbal information by desirably combining verbal unit data.

Thus, the voice information is audibly provided from the speaker 15, corresponding to the word "THIS" entered. The judge circuit 271 is operated to detect whether the memory 312 develops the end code signals. Until the end code signals are detected, the voice synthesizer 32 continues to develop the voice information of the word. When the end code signals are detected, the voice synthesizer 32 provides SE signals entering the address counter 292 to increment the address count and terminate the generation of the words from the memory 312, as referred to S12, S13, S14, and S15.

In the above described manner, each time the alphabetical keyboard 12 and the "IN" key switch 131 are actuated to enter a single word, the voice information corresponding to such a single word is provided. When the following word "IS" is entered, a specific item of verbal information, [iz], is pronouced.

The generation of another specific item of verbal information corresponding to the definite article "THE" entered will be described as follows:

The coded signals corresponding to the definite article "THE" are entered to the register 222 by entering the word "THE" through the use of the alphabetical keyboard 12 and then by actuating the "IN" key switch 131. The judge circuit 263 detects that the word presently contained in register 222 is the definite article "THE". Therefore, the CPU causes the flip flop F1 to be turned set as referred to S16. Since the pronunciation of the definite article "THE" is dependent on the head letter of the following word, it is necessary to detect the head letter of the following word. Therefore, the following word is then entered.

When the following word is entered to the register 222, the address within the address counter 291 is subsequently improved, as referred to S7, S8 and S9, until the judge circuit 261 detects that the word stored in the register 222 and the word developed by the memory 311 are equivalent. This operation is similar to the above described manner.

When the judge circuit 261 detects that the words are equivalent, it is determined whether head letter of the word developed by the memory 311, which is identical to the word of the register 222, is a vowel sound or a consonant sound since the flip flop F1 is made in the logical level "1". This determination of the vowel sound or the consonant sound is carried out by the judge circuit 265 which contains a particular logical level developed by the third storage location c of the memory 311. When the logical level "1" is applied to the judge circuit 265, it means the vowel sound. When the logical level "0" is applied, it means the consonant sound.

According to this preferred embodiment, the word following the definite article "THE" is "DESK" so that the judge circuit 265 detects that the vowel sound is not used as the leading letter as referred to S17. The CPU provides the address code $C\eth_2$ of the memory 312 storing the pronunciation [ð ð], to the gate circuit 283. Through the gate circuit 283, this address code is applied to the address counter 292 as referred to S19.

Therefore, the address decoder 302 specifies an address of the memory 312 in which verbal information of [ð ð] is stored. The information is retrieved and provided to voice synthesizer 32 which provides the verbal information of [ð ð] as the definite article [THE] via the speaker 15.

Once the judge circuit 271 detects the end code as referred to S12, the flip flop F1 is made reset as referred to S20 on the basis that the flip flop F3 is not in the logical level "1" as referred to S13 and the flip flop F1 is in the logical level "1" as referred to S14. S7 is executed again. As referred to S7, the word developed by the memory 311 under the control by the address counter 291 and the word stored in the the register are equivalent. S10 is executed to detect that the flip flop F1 is not in the logical level "1". S11 is executed so that the gate circuit 281 is made conductive and particular head address data corresponding to the word "DESK", which is developed from the second storage locations b of the memory 311 with the help of the address counter 291, are introduced into the address counter 292. The memory 312 provides the verbal information of "DESK" which is applied to the voice synthesizer 32. The speaker 15 generates the verbal information.

In the case where the head letter of a word following the definite article "THE" is a vowel sound, S25 is executed to apply the address data, namely, the code information $C\eth_i$ to the address counter 292 through the gate circuit 283. The code information $C\eth i$ can specify the particular address containing the verbal information [$\eth$ i]. Thus, the memory 312 provides the verbal information [$\eth$ i] which is applied to the voice synthesizer 32. The speaker 15 generates the verbal information.

Thus, when the judge circuit 263 detects that the register 222 contains the definite article "THE", the pronunciation of the definite article is not provided before the following word has been entered. The judge circuit 265 detects whether the head letter of the following word requires the vowel sound or the consonant sound. The pronunciation of the definite article is dependent on the head letter of the following word. The detection of the vowel sound or the consonant sound is made on the basis of the information stored in each of the third storage locations c of the memory 311. Each of the third storage locations corresponds to one of the words stored in the first storage locations a of the memory 311. It is therefore unnecessary to detect the letters of each of the words. This results in an advantageous simplified arrangement of the judge circuits.

A similar requirement of changing the pronunciation of words such as articles depending on the following word is present in French and the present invention can applied to such a language.

If there is no word in the memory 311 equivalent to a word entered by the alphabetical keyboard 12, this condition is notified by the following process:

When a word is entered by the alphabetical keyboard 12 and no word equivalent to the word is contained in the memory 311, steps S7 through S9 are repeated so that the address counter 291 counts all the addresses of the memory 311 from the head address to the last address. Judge circuit 262 detects when the address counter 291 counts the last address of the memory 311.

Accordingly, the CPU provides specified address data, namely, the code information CnA toward the address counter 292 through the gate circuit 282. The code information CnA can specify a particular address of the memory 312 wherein there is contained a specific item of verbal information meaning that no word in memory 311 is equivalent to the word entered. Such verbal information is the word "NOTHING", for example.

The particular address of the memory 312 is selected by the CPU and the counted value of the address counter 292 is set to the above described address. The memory 312 provides the voice information of "NOTHING" toward the voice synthesizer 32. The voice information of "NOTHING" is audibly provided by the speaker 15.

Translation from an English sentence, for example, "THIS IS THE DESK" to the equivalent Japanese sentence is described.

All the words forming the English sentence are entered by the alphabetical keyboard 12. The "TR" key switch 132 is actuated to conduct the above translation. When key code signals of the "TR" key switch 132 are introduced into the control circuit 21, the CPU detects the actuation of this key switch as referred to S27, in order to commence the translation operation.

That is, the CPU detects whether the flip flop F4 is in the logical level "1". The flip flop F4 is used to detect whether the "TR" key switch 132 is actuated one or more times. It is turned set by the first actuation of the "TR" key switch 132. It is not yet turned set when a particular code "c." representing a period is stored in the register 221 as referred to S29. As referred to S30, the flip flop F2 is turned reset for the purpose of effecting the operation when the "IN" key switch 131 is actuated. The above described S5 is executed again.

The just entered word, namely, "DESK" is introduced to the register 222 so that S6 through S11 are executed. The voice synthesizer 32 provides pronunciation of "DESK" with the help of the speaker 15. In this manner, pronunciation of the input words are performed. Subsequently, pronunciation of the translated words equivalent to the input words is enabled since S31 is executed after S12 through S15.

The input words of English stored in the register 222 are applied to the judge circuit 268 and the driver 24. The display 14 provides an indication of "THIS IS THE DESK". At the same time, the counted value of the address counter 293 is set to be the head address of the memory 313. On the basis of the counted value of the address counter 293, the address decoder 303 specifies an address of the memory 313. The judge circuit 268 is provided to detect whether the sentence stored in the register 221 and a sentence generated by the memory 313 are equivalent.

When the judge circuit 268 provides its output signals representing that they are not equivalent, the CPU causes the counted value of the address counter 293 to advance by one as referred to S32. Simultaneously, the judge circuit 267 detects whether the counted value of the address counter 293 is over the last address number of the memory 313 which is continuously applied. Until the counted value of the address counter 293 is equal to the last address number of the memory 313 or the judge circuit 268 provides the equivalence representing signals, the counted value of the address counter 293 is repeatedly advanced by one. As referred to S31 through S33, the detection of the equivalency is repeated by the subsequent advancement of the address of the memory 313.

When the judge circuit 268 detects that the above two types of sentences are equivalent, and provides the equivalence detecting signals, an item of the head address data is developed from the second storage location b of the memory 313 corresponding to the sentence "THIS IS THE DESK". The item of the head address data is used to specify the head address data of the memory 314, in which the corresponding translated sentence is stored. The head address data are applied to the address counter 294 through the gate circuit 284 for setting purposes.

The address counter 294 provides the head address data to the address decoder 304, whereby the memory 314 is addressed to provide the verbal information of the translated Japanese sentence equivalent to the sentence stored in the register 221. The verbal information is applied to the voice synthesizer 32. The voice synthesizer 32 supplies the voice information through the use of the speaker 15.

If it is desired to repeat the above pronunciation of the translated Japanese sentence, the "TR" key switch 132 is actuated once more. Therefore, the above described pronunciation of the translated Japanese sentence is repeated according to the above described manner.

If a wrong word is erroneously entered or the translation operation has been completed, the "CL" key switch 133 is actuated. Therefore, the clear circuits 251 and 252 cancel the information in the registers 221 and 222. At the same time, the CPU makes the flip flops F1 through F4 reset as referred to S37 through S42.

If it is desired to input a sentence of Japanese to obtain a corresponding English sentence, it is possible to provide pronunciation of the Japanese sentence entered and the English sentence translated. In such a case, the alphabetical keyboard 12 should be replaced by another type of keyboard for entering words in Japanese such as a keyboard including a full number of Japanese alphabetical key switches.

Further, in such case, the memory 311 should contain Japanese words and the memory 312 should contain items of verbal information corresponding to the Japanese words of the memory 311. The memory 313 should contain Japanese sentences. The memory 314 should contain items of verbal information corresponding to translated, English sentences equivalent to the Japanese sentences of the memory 313.

In such a case, it is also possible to provide different pronunciation of the definite article "THE" contained in the translated, English sentences, dependent on the pronunciation of the head letter of the following word.

Further, it may be possible that the above described keyboard means be replaced by any type of optical character reader (OCR).

In the above described preferred embodiments, each time a single word has been entered, pronunciation of the word is provided. Alternatively or additionally, it is further possible that after some words forming a particular sentence have been entered, pronunciation of the sentence may be provided.

While only certain embodiments of the present invention have been described, it will be apparent to those skilled in the art that various changes and modifications may be made therein without departing from the spirit and scope of the invention as claimed.

What is claimed is:

1. An electronic translator device wherein first words represented in a first language are entered to obtain second words represented in a second language equivalent to the first words, comprising:
   input means for entering the first words;
   first memory means for storing a plurality of words represented in the first language;
   second memory means for storing a plurality of items of verbal information corresponding to the plurality of words stored in said first memory means;
   third memory means for storing a plurality of sentences comprised of words stored in said first memory means;
   fourth memory means for storing a plurality of items of verbal information related to translated sentences, represented in the second language, corresponding to the plurality of sentences stored in said third memory means;
   translation means responsive to entry of the first words by said input means for addressing said first, third and fourth memory means for translating a first sentence comprised of said first words and stored in said third memory means and for retrieving from said fourth memory means verbal information related to a translated sentence corresponding to said first sentence; and
   voice synthesizer means for providing an audible output of said verbal information related to the translated sentence and responsive to entry of each of the first words by the input means for addressing said second memory means for retrieving particular verbal information corresponding to each first word entered and for providing an audible output of each first word entered.

2. The device of claim 1, wherein said second memory means stores an additional item of verbal information indicating that a first word entered by the input means is not contained within said first memory means.

3. The device of claim 1, further comprising translation enabling switch means for activating said translation means.

4. The device of claim 1, wherein said input means comprises an alphabetical keyboard containing a plurality of alphabetical key switches.

5. An electronic translator device wherein a first word represented in a first language is entered to obtain a second word represented in a second language equivalent to the first word, comprising:
   input means for entering the first word;
   first memory means for storing a plurality of words, represented in the first language, including at least one special word which is pronounced differently depending on the word following said special word in a sequence of words;
   second memory means for storing a plurality of items of verbal information corresponding to the plurality of words stored in the first memory means;
   said first memory means further storing a plurality of items of information each corresponding to respective words in said first memory and representing whether the head letters of the respective words are pronounced with a vowel sound or a consonant sound;
   access means responsive to entry of the first words by the input means for addressing said first and second memory means for retrieving a selected item of verbal information corresponding to one of the first words;
   first detection means responsive to said input means for detecting the input of the special word included in the first words;
   second detection means responsive to the first detection means for addressing said first memory and for detecting the pronunciation of the head letter of the input first word following the special word;
   control means responsive to said second detection means for controlling said access means to select verbal information corresponding to the correct one of several pronunciations of the special word; and
   voice synthesizer means responsive to said access means and said control means for providing an audible output of the first words including said special word.

6. An electronic translator device wherein a first word represented in a first language is entered to obtain a second word represented in a second language equivalent to the first word, comprising:
   input means for entering the first word;
   first memory means for storing a plurality of words, represented in the first language, including at least one special word which is pronounced differently depending on the pronunciation of the following word in a sequence of words;

second memory means for storing a plurality of items of verbal information corresponding to the plurality of words stored in the first memory;

access means responsive to input of one of the first words by the input means for addressing said first and second memory means for retrieving a selected item of verbal information corresponding to one of the first words;

first detection means responsive to said input means for detecting the input of the special word included in the first words;

second detection means responsive to said first detection means for detecting the pronunciation of the head letter of the first word following the special word in a sequence of words;

control means responsive to said second detection means for controlling selection of verbal information corresponding to the special word by said access means to change the pronunciation of the special word; and voice synthesizer means responsive to said access means and said control means for providing audible output of the first words.

* * * * *